United States Patent [19]

Sato et al.

[11] 4,253,124
[45] Feb. 24, 1981

[54] TAPE RECORDER

[75] Inventors: Masanobu Sato; Kenzi Furuta, both of Tokyo, Japan

[73] Assignees: Olympus Optical Co., Ltd.; Casio Computer Co., Ltd., both of Tokyo, Japan

[21] Appl. No.: 12,039

[22] Filed: Feb. 14, 1979

[30] Foreign Application Priority Data

Feb. 21, 1978 [JP] Japan .................................. 53-18727

[51] Int. Cl.³ .............................................. G11B 17/00
[52] U.S. Cl. ...................................................... 360/69
[58] Field of Search ....................... 360/72.1, 72.3, 69, 360/84–85

[56] References Cited

U.S. PATENT DOCUMENTS

| | | | |
|---|---|---|---|
| 3,949,425 | 4/1976 | Perret et al. | 360/85 X |
| 4,005,483 | 1/1977 | Kuwano | 360/69 |

*Primary Examiner*—John H. Wolff

[57] ABSTRACT

A tape recorder, wherein a plurality of magnets are mounted on the peripheral surface of a rotary disc supported on a magnetic tape takeup (feed) reel in order to measure the travelling distance of a magnetic tape; and when said magnets are brought to rest in such position as causes a lead switch to be operated at the cutoff of a main power source, then a transistor connected to one end of the lead switch is rendered nonconducting by its base resistor, thereby interrupting the input circuit of a counter-display section.

6 Claims, 4 Drawing Figures

TAPE RECORDER

BACKGROUND OF THE INVENTION

1. Field of the Invention

This invention relates to a tape recorder provided with a counter-display section which electronically calculates and displays the length of the wound portion of a rotated magnetic tape and the current time of the day by applying a different power source from that of a tape run control section.

2. Prior Art of the Invention

In recent years there have been developed various types of compact tape recorder which are provided with a time-counting function and designed to measure and display the current time of the day and the length of the wound portion of a rotated magnetic tape by means of a photoelectric display using, for example, a light-emitting diode (abbreviated as "LED") or liqud crystal.

Such compact tape recorder known to data performs many functions by a single power source. Therefore, a cell used as a power source has a short effective life. For example, two 1.5 volt miniature dry cells used with a compact tape recorder comprising a miniature cassette have an overall effective life of only about 11 hours. Each time the cell life is exhausted, the time-counting function of said tape recorder is stopped, giving rise to considerable inconvenience. Accordingly, it has been contemplated to apply different power sources for the original functions of a tape recorder itself and the operation of a built-in device for counting the current time of the day and carrying out a photoelectric display thereof.

FIG. 1 shows the circuit arrangement of a prior art tape recorder provided with a power source for a tape recorder itself and another power source for a time-counting and photoelectric display function.

A section 11 for measuring the length of the wound portion of a rotated magnetic tape (hereinafter referred to as "a tape run-measuring section") comprises a reel 12 for the takeup or feed of the magnetic tape; a disc 13 securely fixed to the reel 12; a plurality of magnetics 14, 15 equidistantly arranged on the peripheral surface portion of the disc 13; and a lead switch 16 set at a point alternately approached by the magnets 14, 15. The tape run-measuring section 11 issues pulse signals in a number corresponding to the run of a magnetic tape at the time of, for example, recording, reproduction, quick feed or unwinding. While the tape recorder is in operation, the lead switch 16 is alternately closed and opened by the magnets 14, 15 mounted on the disc 13. Pulse signals issued from the tape run-measuring section 11 when the switch 16 is closed are supplied to a counting section 17. This counting section 17 is formed of a pullup resistor 18, field effect transistor 19 and counter 29. This counter 29 comprises, for example, an adding-/subtracting circuit and totaling circuit. The counting section 17 counts pulse signals received. A signal denoting a counted number of pulses is conducted to a display device 24 through a mode changeover switch 20 (which is connected to a contact 21 at this time) and a decoder-driver circuit 23. The mode changeover switch 20 is used to carry out a changeover of operation mode between the measurement of the traveling distance of a magnetic tape and the display of the current time of the day. The decoder/driver circuit 23 decodes an output signal from the counter 29. The decoded signal is sent forth to the display device 24, which in turn indicates the measured tape run.

An output signal from an oscillator 25 is supplied to a time-counting circuit 27 through a frequency divider 26. Where the mode changeover switch 20 is connected to a contact 22, then an output signal from the time-counting circuit 27 is delivered to the display device 24 through the decoder-driver circuit 23.

The positive side of a display power source 28 is connected to the power supply terminals of the tape run-counting section, decoder/driver circuit 23, display device 24, oscillator 25, frequency divider 26, and time-counting circuit 27.

The positive side of a tape recorder power source 31 is connected through a tape recorder main switch 32 to the power supply terminals of an audio amplifier 33 and motor drive control circuit 34. The output terminal of said control circuit 34 is connected to a motor 35.

The magnetic tape takeup (or feed) reel 12 is rotated by a drive transmission device (not shown) driven by the motor 35. In this case, a cell for a time-counting function is likely to be unnecessarily depleted.

The run of a magnetic tape is measured by mounting a magnet on a rotor such as a magnetic tape takeup (or feed) reel, providing a lead switch at a point approached by the magnet, and counting a number of pulses issued from the lead switch by a counting circuit. However, the rotor fitted with the magnet does not always stop at a prescribed point. Sometimes, therefore, the rotor may be brought to rest at the point at which the lead switch would be rendered conducting. For convenience, FIG. 1 indicates only two magnets. Practically, however, a large number of magnets are equidistantly arranged. Therefore, the possibility grows large that the rotor stops at the aforesaid point at which the lead switch would be put into operation, thus unnecessarily depleting the capacity of a cell for a time-counting function.

SUMMARY OF THE INVENTION

It is accordingly the object of this invention to provide a tape recorder having a different power source for indication of the measured travelling distance of a magnetic tape and the current time of the day from the power source used with a section for controlling the tape run, which is characterized in that the input circuit of the tape run-measuring section for issuing a number of pulse signals proportional to the travelling distance of a magnetic tape and the input circuit a signal denoting the recording mode are left open while the tape recorder ceases to carry out the original function of recording and reproduction, thereby, saving excess overall power consumption.

To attain the above-mentioned object, this invention provides a tape recorder which comprises a magnetic tape run control section for controlling the run of a magnetic tape for recording, reproduction, unwinding and quick feed; a power source for the magnetic tape run control section; a magnetic tape run-measuring section for measuring the travelling distance of the magnetic tape; a counter-display section for counting output signals from the magnetic tape run-measuring section and output signals from a time-counting section and displaying the results of said counting on a photoelectric display; and a power source for said counter-display section, and wherein the magnetic tape run-measuring section is formed of means for establishing and interrupting the input circuit of the counter-display section by means of a rotor rotating with the run of the magnetic tape; and means for suppressing the flow of current from the power source for the counter-display section to the input circuit thereof, when the power source for the magnetic tape run control section is cut off, and the rotor stands at rest in the position in which the means for establishing and interrupting the input circuit of said counter-display section might otherwise be rendered conducting.

DETAILED DESCRIPTION OF THE PREFERRED EMBODIMENTS

Figure 1:
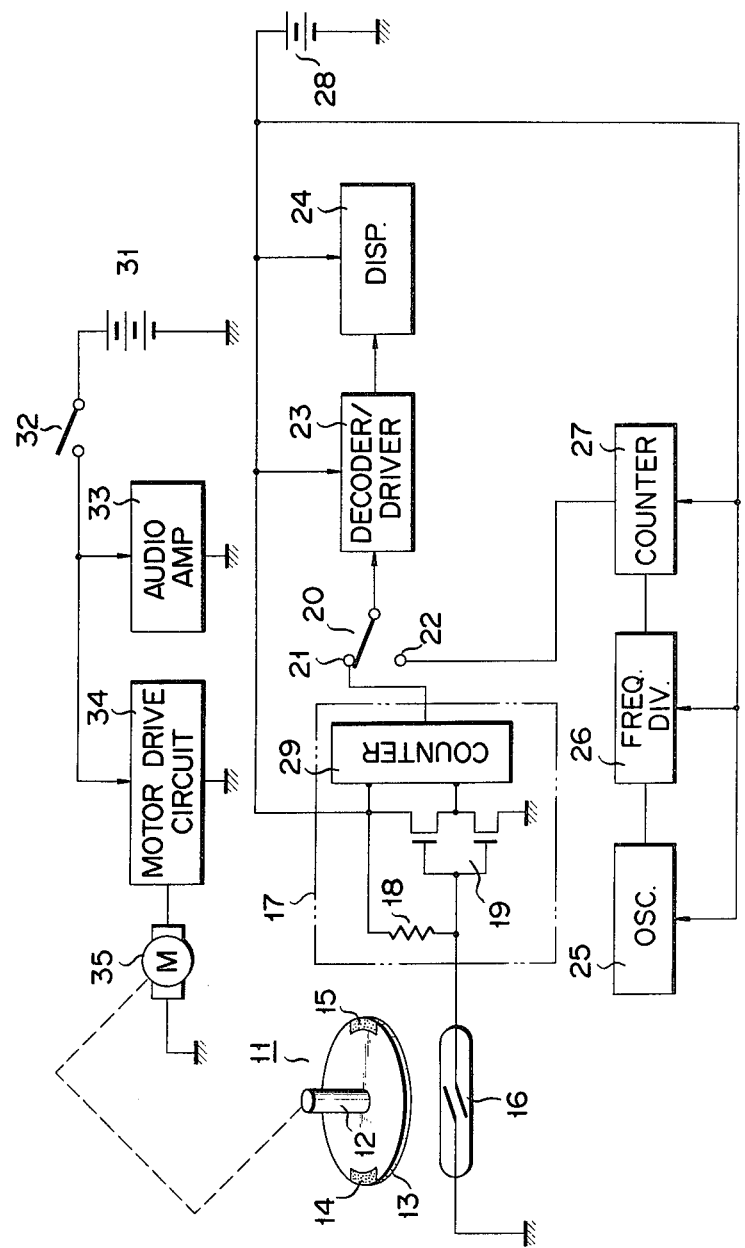
FIG. 1 is a block circuit diagram of a prior art tape recorder provided with a photoelectric display.
Figure 2:
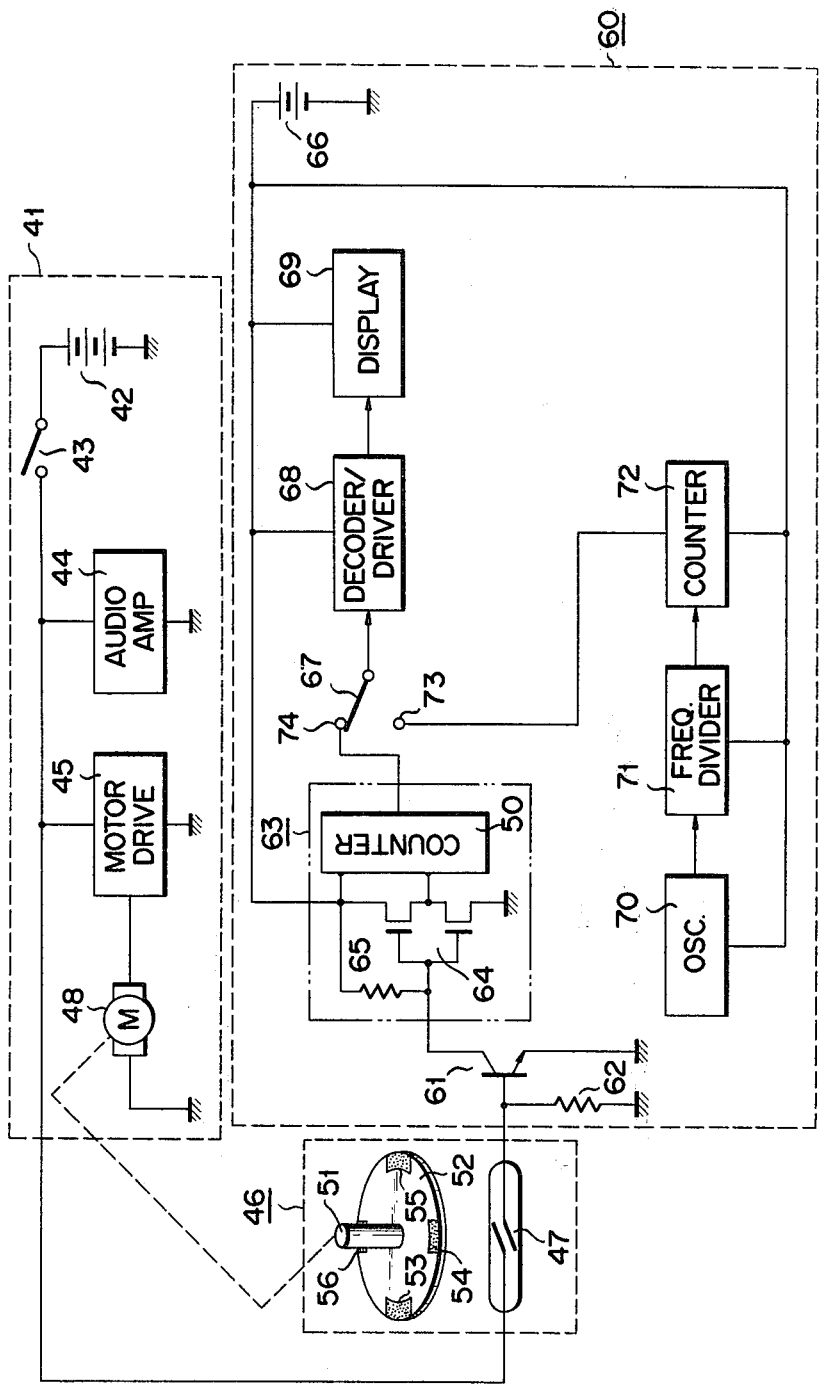
FIG. 2 is a block circuit diagram of a tape recorder according to one embodiment of this invention which is provided with a photoelectric display.

There will now be described the tape recorder of this invention provided with a photoelectric display by reference to FIG. 2 showing its block circuit diagram.

A magnetic tape run control section 41 has a power source 42, whose negative side is grounded, and whose positive side is connected through a main switch 43 to the power supply terminals of an audio amplifier 44 and a motor drive circuit 45, and further to one end of a lead switch 47 of the later described magnetic tape run-measuring section 46. The other ends of the audio amplifier 44 and motor drive circuit 45 are grounded. The other end of a motor 48 is grounded. The motor 48 is functionally connected to a magnetic tape takeup (or feed) reel 51 of the later described magnetic tape run-measuring section 46. A rotary disc 52 is securely fitted to the reel 51. A plurality of magnets 53, 54, 55, 56 are equidistantly mounted on the rotary disc 52. A lead switch 47 is positioned close to any one of said magnets 53, 54, 55, 56. The opposite input end of the lead switch 47 is connected to a counter-display section 60.

The counter-display section includes a transistor 61, whose base is connected through a base resistor 62 to the lead switch 47 of the magnetic tape run-measuring section 46. The other end of the base resistor 62 is grounded. The base of the transistor 61 is connected to a counter section 63. The emitter of said transistor 61 is grounded.

The counter section 63 is formed of a counter 50, an FET 64 and pullup resistor 65. The counter 50 consists of an addition-subtraction circuit and totaling circuit. (For convenience of description, the FET 64 and pullup resistor 65 alone are indicated). The pullup resistor 65 is connected between the collector of the transistor 61 and a power source 66 for the counter section 60. The output terminal of the counter section 63 is connected to the contact 74 of a mode changeover switch 67 and also to a decoder-driver circuit 68 through said switch 67.

The mode changeover switch 67 is used to carry out an exchange between the mode of displaying the measured distance of a magnetic tape and the mode of indicating the current time of the day. The output terminal of the decoder-driver circuit 68 is connected to a photoelectric display 69. The power supply terminals of the decoder-driver circuit 68 and photoelectric display 69 are connected to the positive side of the power source 66 for the counter-display section 60. This counter-display section 60 includes an oscillator 70, whose output terminal is connected to a frequency divider 71. The output terminal of this frequency divider 71 is connected to a time counter 72, whose output terminal is connected to a contact 73 of the mode changeover switch 67.

With a tape recorder constructed as described above, let it be assumed that the power source 42 for the tape recorder is rendered nonconducting due to the release of the main switch 43, and the magnets 53, 54, 55, 56 mounted on the rotary disc 52 of the tape run-measuring section 46 are brought to rest in such position as causes the lead switch 47 to be put into operation. At this time, no current runs through the base resistor 62. Therefore, no voltage drop occurs in said base resistor 62, and the base potential of the transistor 61 is zero. Since no current flows through the collector-emitter circuit of the transistor 61, pulse signals issued from the lead switch 47 are supplied to the counter section 63.

The inoperative state of the magnetic tape run control section 41 is herein defined to include the inoperative state of the main switch 43, the nonconducting state of a pause switch (not shown) for temporarily suspending the recording and reproduction of a tape recorder, and the automatic stop of the tape recorder upon detection of the end of a magnetic tape. At this time, the main switch 43 is obviously rendered nonconducting due to the establishment of the pause switch circuit or the automatic stop of the tape recorder.

Figure 3:
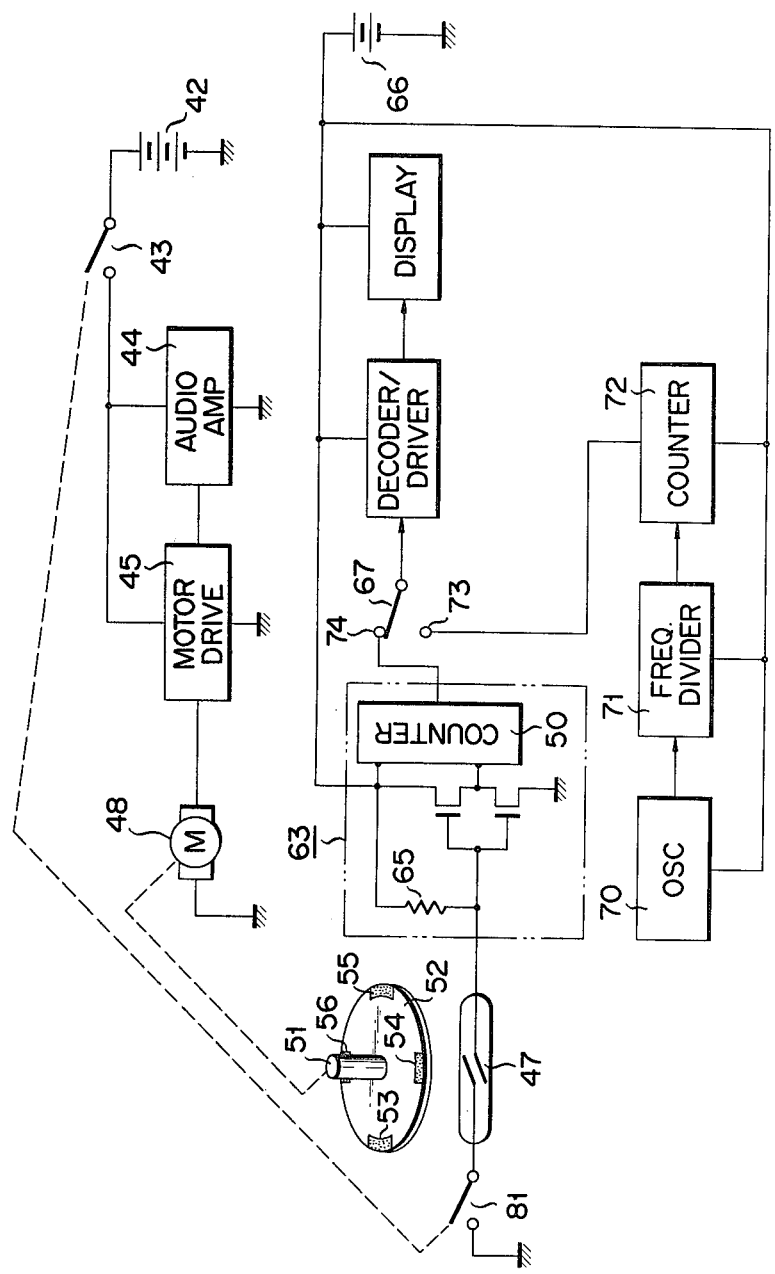
FIG. 3 is a block circuit diagram of a tape recorder according to another embodiment of the invention which is provided with a photoelectric display.

There will now be described by reference to FIG. 3 a tape recorder according to another embodiment of this invention which is provided with a photoelectric display. The parts of FIG. 3 the same as those of FIG. 2 are denoted by the same numerals, description thereof being omitted. With the embodiment of FIG. 3, the input circuit is mechanically interrupted. One end of the lead switch 47 is connected to the counter section 63, and the other end thereof is connected to a switch 81 operated interlockingly with the main switch 43 of the tape recorder.

Where, with a tape recorder constructed as described above, the main switch 43 of the magnetic tape run control section 41 is opened, then the switch 81 is rendered nonconducting interlocking with the main switch 43. If, therefore, the magnets 53, 54, 55, 56 mounted on the rotary disc 52 are brought to rest in such position as causes the lead switch 47 to be rendered conducting, no current flows one to the opened state of the switch 81, thereby preventing the excess depletion of the power source 66 of the counter-display section 60.

Figure 4:
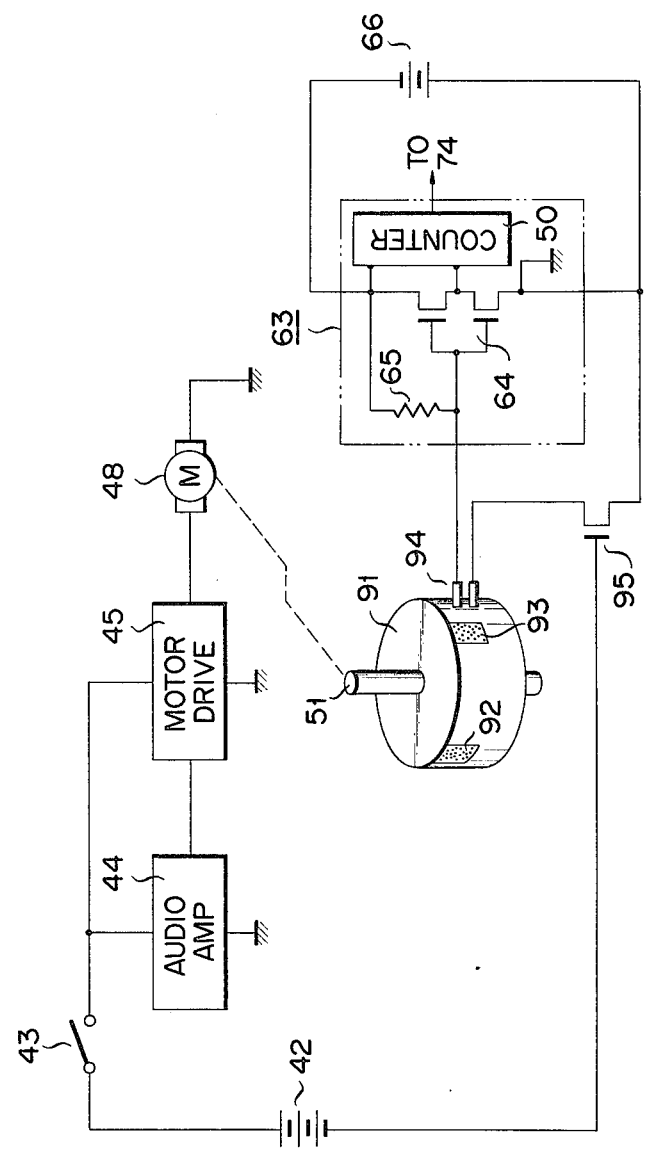
FIG. 4 is a block circuit diagram of a tape recorder according to still another embodiment of the invention which is provided with a photoelectric display.

There will now be described by reference to FIG. 4 a tape recorder according to still another embodiment of this invention which is provided with a photoelectric display. The parts of FIG. 4 the same as those of FIGS. 2 and 3 are denoted by the same numerals, description thereof being omitted. The magnetic tape run-measuring section comprises a plurality of conductors 92, 93 spatially arranged on the peripheral surface of a cylinder concentrically fitted to the magnetic tape takeup (or feed) reel 51. A pair of contactors 94 are made to slide over said conductors 92, 93. One of said contactors 94 is connected to the counter section 63, and the other is connected to the drain of a field effect transistor (FET) 95. The source of said FET 95 is connected to the positive side of the cell 66, and the gate thereof is connected to the negative side of the cell 42.

Where a tape recorder constructed is described above by reference to FIG. 4 is rendered operative due to the close of the main switch 43, then the paired contactors 94 are rendered conducting by means of the conductors 92, 93, causing the counter section 63 to be put into operation.

While the main switch 43 is left open, the FET 95 is not supplied with a gate voltage, and not rendered conducting, if, therefore, the paired contactors 95 touch the conductors 92, 93. The counter section 63 remains inoperative, realizing the same good effect as in the embodiments of FIGS. 2 and 3.

With a tape recorder embodying this invention in which the traveling distance of a magnetic tape and the current time of the day are indicated by a photoelectric display, the input circuit of the pulse generator and the input circuit of a signal denoting the recording mode are interrupted when the tape recorder is through out of operation, thereby preventing excess overall power consumption.

What we claim is:

1. A tape recorder which comprises: a magnetic tape run control section for controlling the run of a magnetic tape for recording, reproduction, unwinding and quick feed; a power source for the magnetic tape run control section; a magnetic tape run-measuring section for determining the travelling distance of the magnetic tape; a counter-display section for counting output signals from the magnetic tape run-measuring section and output signals from a time-counting section and for displaying the results of said counting on a photoelectric display; a power source for said counter-display section, said magnetic tape run-measuring section comprising means for establishing and interrupting the input circuit of the counter-display section by means of a rotor rotating with the run of the magnetic tape; and means operatively connected to said counter-display section for suppressing the flow of current from said power source for said counter-display section to the input circuit thereof, when said power source for said magnetic tape run control section is shut off and the rotor stands at rest in a position in which said means for establishing and interrupting the input circuit of said counter-display section might be rendered conducting.

2. The tape recorder according to claim 1, wherein the means for establishing and interrupting the input circuit of the counter display section is formed of at least one magnetic element mounted on the peripheral surface of said rotor; and a lead switch which causes the input circuit of the counter-display section to be established and interrupted by means of said magnetic element.

3. The tape recorder according to claim 2, wherein the means for suppressing the flow of current to the input circuit of the counter-display section consists of a transistor in which one end of the collector-emitter passage is connected to the counter display section, and the other end thereof is grounded, and whose base is connected to the lead switch; and a resistor which is connected between the base of said transistor and the ground.

4. The tape recorder according to claim 2, wherein the means for suppressing the flow of current to the input circuit of the counter-display section is a switch which is connected between the lead switch and the ground and is operated interlockingly with said power source for the magnetic tape run control section.

5. The tape recorder according to claim 1, wherein the means for establishing and interrupting the input circuit of the counter-display section is formed of at least one conductor mounted on the peripheral surface of the rotor; and a pair of contacts for establishing and interrupting the circuit of the counter-display section in contact with said conductor.

6. The tape recorder according to claim 5, wherein the means for shutting off the flow of current to the input circuit of the counter-display section is a field effect transistor whose drain is connected to said pair of contactors, whose source is connected to said power source for the counter-display section, and whose gate is connected to said power source for the magnetic tape run control section.

* * * * *